455-296 SR
FIP8106 XR 3,855,423
1x 5732b
CROSS REFERENCE

United St
Brendzel et al.

[11] 3,855,423
[45] Dec. 17, 1974

[54] NOISE SPECTRUM EQUALIZER

[75] Inventors: Henry Tzvi Brendzel, Parsippany, Morris County; Richard Allan Smith, Mount Olive Twp., Morris County, both of N.J.

[73] Assignee: Bell Telephone Laboratories, Incorporated, Murray Hill, N.J.

[22] Filed: May 3, 1973

[21] Appl. No.: 356,918

[52] U.S. Cl. ...... 179/15.55 R, 324/77 B, 333/28 R, 333/18, 179/1 P, 325/473
[51] Int. Cl. ............................................ H04b 1/66
[58] Field of Search....... 179/15.55 R, 15.55 T, 1 P, 179/1 SA, 100.2 K; 333/28 R, 28 T, 18; 325/473, 474; 178/DIG. 12; 235/152; 324/77 B

[56] References Cited

UNITED STATES PATENTS

| | | | |
|---|---|---|---|
| 2,866,001 | 12/1958 | Smith | 179/15.55 R |
| 3,091,665 | 5/1963 | Schroeder | 179/15.55 R |
| 3,717,812 | 2/1973 | Hirsch | 324/77 B |

*Primary Examiner*—Kathleen H. Claffy
*Assistant Examiner*—Thomas D'Amico
*Attorney, Agent, or Firm*—H. L. Logan; G. E. Murphy

[57] ABSTRACT

Apparatus for noise spectrum equalization of applied spectrum samples to enhance detection of periodic signals embedded in noise. Equalization is achieved with apparatus which repetitively searches for and detects strong periodic signals within the total signal spectrum and subsequently disregards the detected signals in computing an equalizing signal representative of background noise. The applied power spectrum is divided by the equalizing signal to obtain an equalized, flat, spectrum of zero mean, yet of unchanged signal levels relative to noise variance. The use of iterative detection of strong periodic signals in computing the equalizing signal results in noise spectrum equalization apparatus that is insensitive to the unwanted effects of strong periodic signals.

16 Claims, 22 Drawing Figures

3855423
OR IN 179/15.55R

NOISE SPECTRUM EQUALIZER

GOVERNMENT CONTRACT

The invention herein claimed was made in the course of or under a contract with the Department of the Navy.

BACKGROUND OF THE INVENTION

This invention relates to signal detection in the presence of noise and, more particularly, to apparatus for automatically equalizing the power spectrum of input signals prior to signal detection.

In the art of signal detection, numerous occasions arise when input signals contain noise of sufficient magnitude to constitute an impediment to periodic signal detection. To overcome this problem, various methods are used to extract the desired signal from the accompanying noise. These methods include measurement of incoming broadband power, statistical analysis of incoming power, spectrum analysis, cross correlation, filtering of particular frequency bands, detailed spectrum analysis, and others. When the method of spectrum analysis is used, the spectrum is generally searched for a known behavior or a known characteristic of the desired signal.

In some spectrum analysis applications the absolute spectrum level is not critical because the signal-to-noise ratio contains the vital information sought. In such analysis applications, equalization of the analyzed spectrum relative to the noise power is advantageous because it allows for more uniform and, hence more automated treatment of the periodic signal detection task.

In the prior art, such equalization is done in a manner similar to that described by C. P. Smith, U.S. Pat. No. 2,866,001 issued Dec. 23, 1958. In that system the input signal is passed through a plurality of contiguous bandpass filters, and the power output of those filters is used to control the gain of a plurality of amplifiers connected to each filter, thereby obtaining a relatively fixed total power output from each amplifier. Subsequently, the amplifiers' outputs are summed, resulting in a signal which exhibits an equalized spectrum. The bandwidth of these filters must be wide compared with the bandwidth of the anticipated periodic signals because, otherwise, the periodic signal itself would be "equalized" out of existence. However, with wide bandwidth filters, strong periodic signals, i.e., signals of excessive power relative to background noise located anywhere within the band of a particular filter affect the amplifier's output throughout the band, causing a depression of the equalized spectrum in the neighborhood of the strong periodic signal, and causing attenuation of the periodic signal itself. This is undesirable because with automatic signal detection such a depression may prevent the detection of weak periodic signals. Another disadvantage of the above Smith system is the mutual exclusivity of the bandpass filters. This exclusivity tends to cause discontinuities in the equalized spectrum, which when large, give the undesired appearance of artifact signals.

It is, therefore, an object of this invention to provide apparatus for noise spectrum equalization.

It is another object of this invention to provide equalization apparatus that is insensitive to the effects of strong signals.

It is still another object of this invention to provide for noise spectrum equalization without generation of undesired artifact signals.

It is yet another object of this invention to provide apparatus that digitally manipulates signals in the frequency domain to achieve noise equalization.

SUMMARY OF THE INVENTION

Consistent with these and other objects, noise spectrum equalization is achieved, in accordance with the principles of this invention, by detecting strong periodic signals prior to equalization. More specifically, input spectrum samples are compressed by a log converter and the compressed samples are repetitively searched for strong periodic signals by a plurality of detection stages connected in cascade. Within each detection stage a neighborhood-mean detection signal, associated with each compressed spectrum sample, is generated by computing the average amplitude of a predetermined number of the compressed spectrum samples, on both sides of each associated compressed spectrum sample. The above computation does not include, however, any compressed spectrum samples which have been identified in a previous detection stage as belonging to a strong periodic signal. Strong signals are detected in each stage by subtracting from each compressed spectrum sample its associated neighborhood-mean detection signal and a predetermined threshold signal. The occurrence of a positive arithmetic difference indicates the existence of a strong periodic signal, and this information, coupled with all previous detected-signal information, is transferred to a following detection stage.

Equalization of the applied spectrum takes place after processing the compressed spectrum samples through a preselected number of detection stages. Following the detection process, all periodic signals of major significance are known, and therefore, a neighborhood-mean equalizing signal, developed in a manner identical to that used for computing the neighborhood-mean detection signal, represents a very good estimate of the true noise mean in the neighborhood of each associated compressed spectrum sample. Accordingly, a neighborhood-mean equalizing signal is computed, and is subtracted from each associated compressed sample, yielding equalized compressed spectrum samples. Finally, each of the equalized compressed samples is expanded by an inverse log converter, yielding the desired equalized spectrum samples.

DETAILED DESCRIPTION

Figure 1:
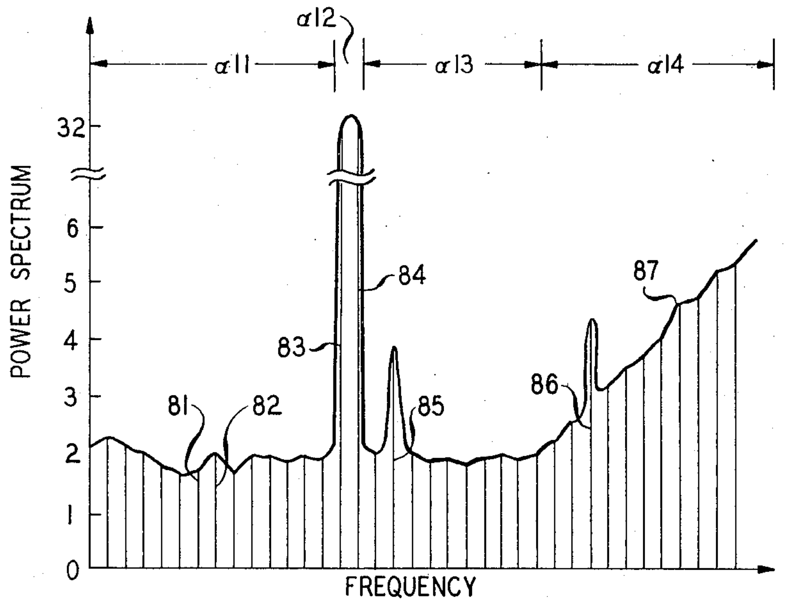
FIG. 1 is an illustration of a sampled power spectrum typically applied to a noise spectrum equalizer.

FIG. 1 illustrates a typical sampled power spectrum signal applied to a noise spectrum equalizer. This sampled spectrum signal may be obtained by performing spectrum analysis of the signal to be equalized with any suitable spectrum analyzer, such as, for example, an FFT analyser described by R. A. Smith in U.S. Pat. No. 3,588,460. With such an analyzer, power spectrum samples appear serially, starting with the lowest frequency sample, and progressively increase in frequency. The frequency spacing between adjacent power spectrum samples, such as samples 81 and 82 in FIG. 1, is related to the sampling rate of the time-function signal at the spectrum analyzer's input. Envelope 87 is provided merely to facilitate an appreciation of the general spectrum characteristics of the signal. Accordingly, it can be observed that region $\alpha$11 in FIG. 1 represents a generally flat noise spectrum signal, at 2 volts, region $\alpha$12 represents a strong periodic signal (composed of two samples 83 and 84), of 32 volts, region $\alpha$13 represents a relatively flat noise spectrum signal of 2 volts with a moderately strong periodic signal (sample 85) of 4 volts, and region $\alpha$14 represents a generally rising noise spectrum signal with an embedded weak periodic signal (sample 86) attaining a level of 4 volts.

Figure 2:
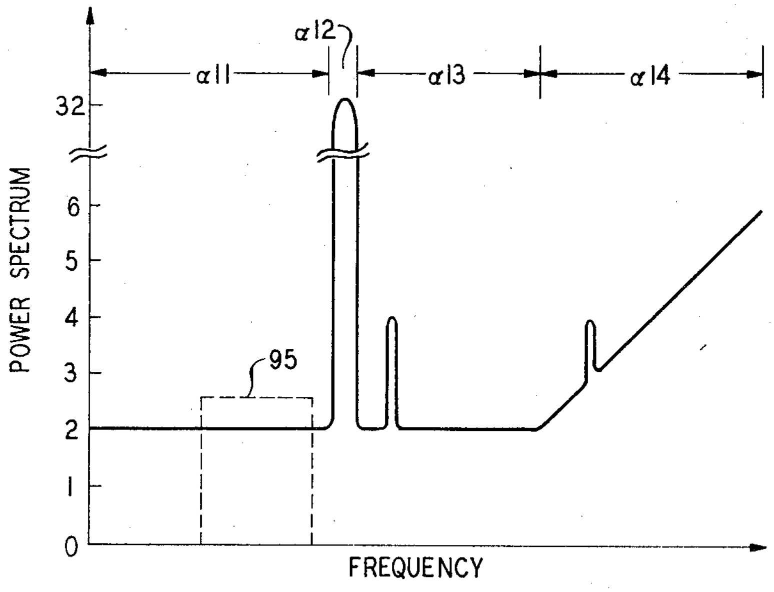
FIG. 2 is an illustration of a smoothed power spectrum corresponding to the power spectrum shown in FIG. 1.

FIG. 2 depicts a smoothed representation of the spectrum in FIG. 1. The use of a smooth spectrum representation serves to accentuate performance characteristics, and therefore, it shall be used in describing the performance of systems disclosed hereinafter.

Figure 3:
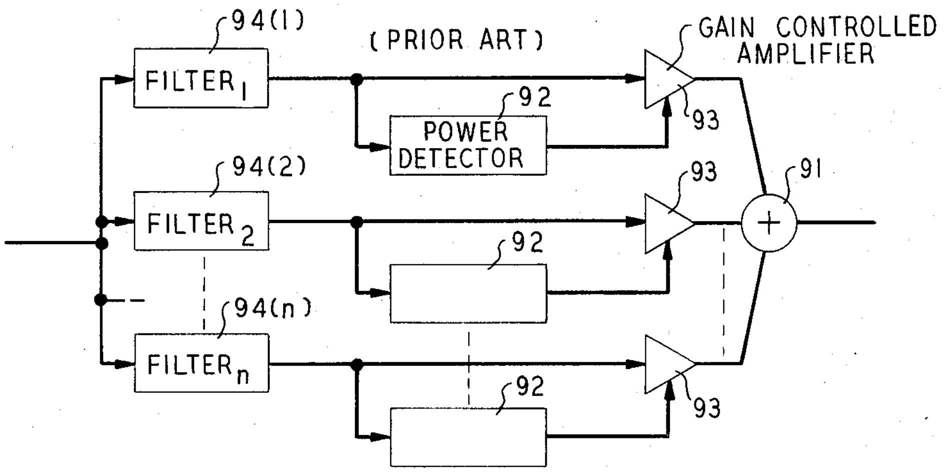
FIG. 3 is a block diagram of a prior art noise spectrum equalizer.
Figure 4:
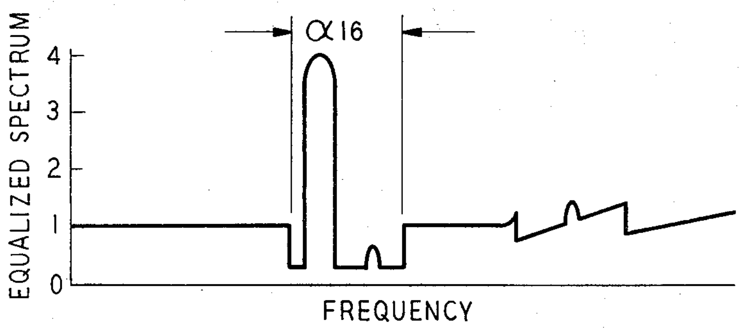
FIG. 4 (PRIOR ART)
FIG. 4 is an illustration of an equalized spectrum, emanating out of the apparatus shown in FIG. 3, in response to the applied spectrum of FIG. 2.

FIG. 3 shows a prior art noise spectrum equalizer that is essentially the same as disclosed by the aforementioned C. P. Smith patent, wherein filters 94(1) through 94($n$) have contiguous bandpass responses, with a bandwidth as designated by dotted rectangle 95 in FIG. 2. The signal having an equalized spectrum, emanating from the output of summer 91 in response to an applied signal having a spectrum as shown in FIG. 2 is shown in FIG. 4. This equalized spectrum exhibits two notable characteristics:

1. Region $\alpha$16 is severely attenuated because of the effect of the strong signal (including attenuation of the strong and the moderately strong periodic signals).
2. Discontinuities in the spectrum exist at the edges of the contiguous bandpass filters.

Figure 5:
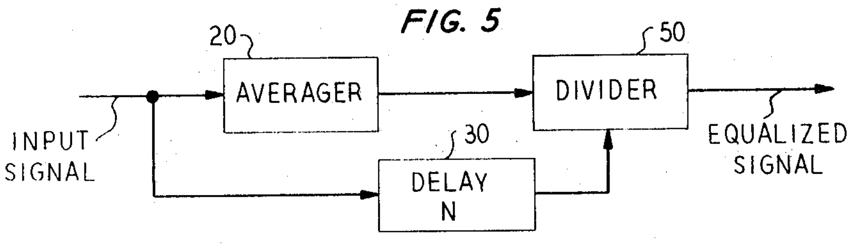
FIG. 5 is a block diagram of a noise spectrum equalizer using the principles of this invention.

FIG. 5 depicts a noise spectrum equalizer, in accordance with the principles of this invention, which eliminates the discontinuity problem. It comprises averager 20, responsive to applied spectrum samples, for generating a neighborhood-mean equalizing signal, delay means 30 for delaying the applied spectrum samples, and divider 50 for generating the equalized spectrum by dividing the delay means 30 output signal by the averager 20 output signal.

Figure 6:
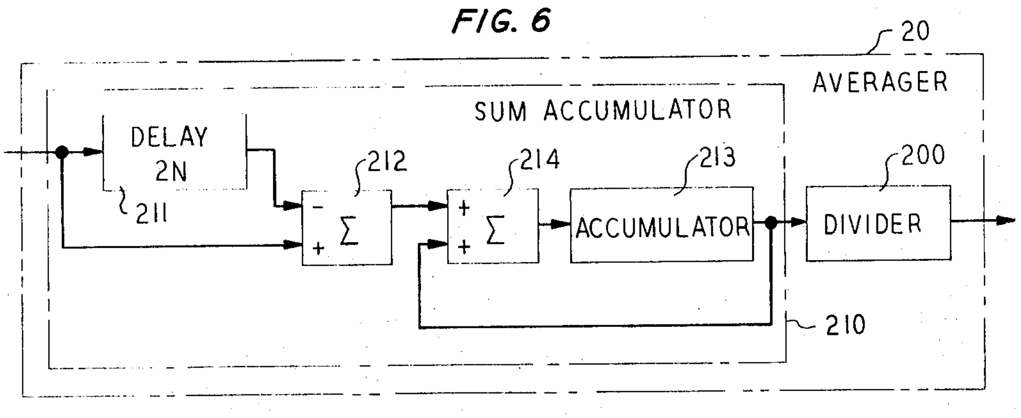
FIG. 6 is a detailed block diagram of the averager used in the apparatus shown in FIG. 5.

The neighborhood-mean equalizing signal generated by averager 20, is a signal which at any one time represents a computed arithmetic amplitude average of the 2N spectrum samples most recently applied to averager 20. This is done by first summing the 2N most recent spectrum samples and then dividing the sum by 2N. In the embodiment of averager 20 shown in FIG. 6, spectrum samples are applied to subtractor 212 (positive input), and are applied to delay element 211 which provides delay and storage of 2N samples. The output signal of delay element 211 is applied to subtractor 212 (negative input) and the resultant difference signal is applied to summer 214, first input. The output signal of summer 214 is inserted into accumulator register 213, while the output of register 213 is connected to summer 214, second input. Elements 211, 212, 214, and 213 comprise sum accumulator 210. Thus element 213 contains the sum of the 2N most recently applied samples. The output signal of accumulator 213, which is the output of sum accumulator 210, is applied to divider 200, wherein it is divided by 2N thus achieving the required result, i.e., a neighborhood-mean equalizing signal representative of the average amplitude of the 2N most recently applied spectrum samples. Divider 20o may be realized, for example, by a division look-up table comprising a read-only memory.

The equalizing signal generated by averager 20 interacts with an applied spectrum sample situated in the center of the 2N sample frequency window so that the average derived by averager 20 corresponds to an average of samples on both sides of the interacting applied spectrum sample. In other words, the average is a neighborhood spectrum sample average of the interacting sample. To provide for this requirement, delay element 30 of FIG. 5 stores and delays N spectrum samples so that the spectrum sample appearing at its output corresponds to the center of the frequency window as defined by averager 20. In other words, the equalizing signal for each spectrum sample comprises N samples at frequencies higher than said spectrum sample, the sample itself, and N-1 samples at frequencies lower than the spectrum sample. With the above signal timing preconditioning, divider 50 achieves the desired spectrum sample equalization by dividing the spectrum sample, supplied by delay element 30, by the neighborhood-mean equalizing signal of averager 20. The resultant sequence of equalized spectrum samples emanating out of divider 50 comprises the equalized spectrum. Mathematically, the output signal of divider 50 may be described by $$A(50) = \mathrm{A}(30)/A{\cdot}A \qquad (1)$$

where $A(50)$ is the output signal of device 50, $A(30)$ is the output signal of device 30 and A·A stands for the arithmetic-average signal of device 20.

Figure 7:
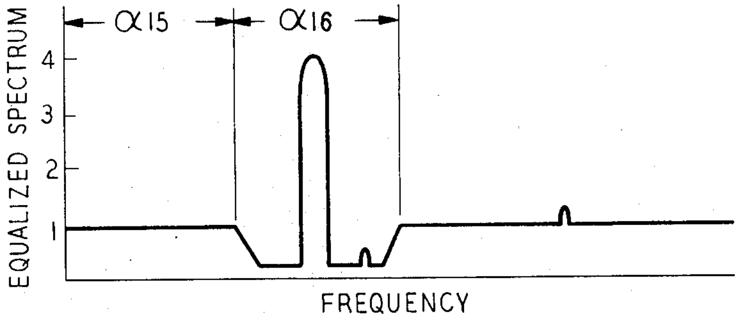
FIG. 7 is an illustration of an equalized spectrum emanating out of the apparatus shown in FIG. 5 in response to the applied spectrum of FIG. 2.

FIG. 7 illustrates the response of the equalizer shown in FIG. 5 to the spectrum illustrated in FIG. 2. It depicts an equalized spectrum that is generally free of discontinuities. The strong periodic signal (samples 83 and 84 in FIG. 1) and the moderately strong periodic signal (sample 85), though attenuated to 4 volts and 0.53 volts, respectively, are clearly discernible, and the weak periodic signal (sample 86) is also clearly detectable at a level of 1.33 volts. Thus, by the practice of this invention, processing discontinuities are eliminated.

Additional performance improvement can be had by preconditioning the signal prior to equalization. Such preconditioning may comprise, for example, the compression of the applied spectrum signal by a compression function, such as a log function ($\log_2$ may be used). Such preconditioning reduces the signal's dynamic range and consequently reduces the amount of hardware required to process the signals. Further, additional, unexpected circuit simplifications and performance improvements are possible because of the unique characteristics of log conversion, as shall be described hereinafter.

Figure 8:
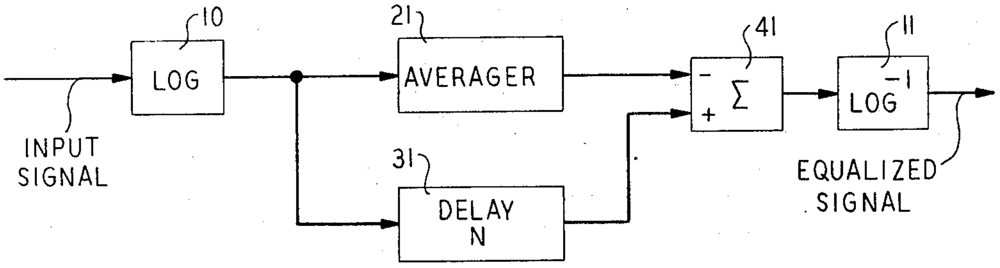
FIG. 8 is an improved noise spectrum equalizer in accordance with the principles of this invention.

FIG. 8 shows one suitable embodiment of such an improved noise spectrum equalizer. In FIG. 8, applied power spectrum samples are converted by log converter 10, which may be any suitably arranged read-only-memory look-up table converter, such as described in Motorola Inc. application Note AN446, and the converted samples are applied to averager 21 and to delay element 31, which operate in the same manner, and serve the same purpose, as averager 20 and delay element 30, respectively, in the system of FIG. 5. The output signal of delay element 31 enters subtractor 41, positive input, and the output signal of averager 21 is applied to subtractor 41, negative input. The compressed equalized spectrum samples emanating from subtractor 41 are expanded by inverse log converter 11, implemented in the same manner as log converter 10, resulting in the desired, equalized, spectrum samples.

In more mathematical terms, the operation of the system of FIG. 8 can be described by $$A\,(11) = \log^{-1}\,[A(31) - A{\cdot}A'], \qquad (2)$$

where $A$ (11) is the output signal of device 11, $A$(31) is the output signal of device 31, and A·A′ is the arithmetic-average signal of averager element 21. It should be noted, however, that A(31) is equal to log [A (30)] of relation (1) and that the arithmetic average A·A′ of averager 21 is $$\frac{1}{N}\sum_{i=1}^{N}\log A_i, \qquad (3)$$

where $A_i$ are the input samples applied to element 10, which is equal to $$\log \prod_{i=1}^{N} (A_i)^{1/N} \qquad (4)$$

This is the log of a geometric average (G·A), therefore relation (2) can be rewritten as $$A\,(11) = \log^{-1}[\log A(30) - \log\,(G{\cdot}A)] \qquad (5)$$

or $$A\,(11) = A\,(30)/G{\cdot}A. \qquad (6)$$

Relation (6) is essentially the same as relation (1), except the *geometric average* is substituted in relation (6) for the *arithmetic average* of relation (1). Fortuitously, a geometric average is less responsive than an arithmetic average to any one element which makes up the average. Consequently, the use of a geometric mean provides an approximation of background noise in the presence of strong signals that is better than the approximation resulting from the use of an arithmetic mean.

This characteristic and advantage of the geometric mean can be more fully understood by perusal of FIGS. 9A – 9D which show the response of the FIG. 8 system to the applied spectrum of FIG. 2.

Figure 9A:
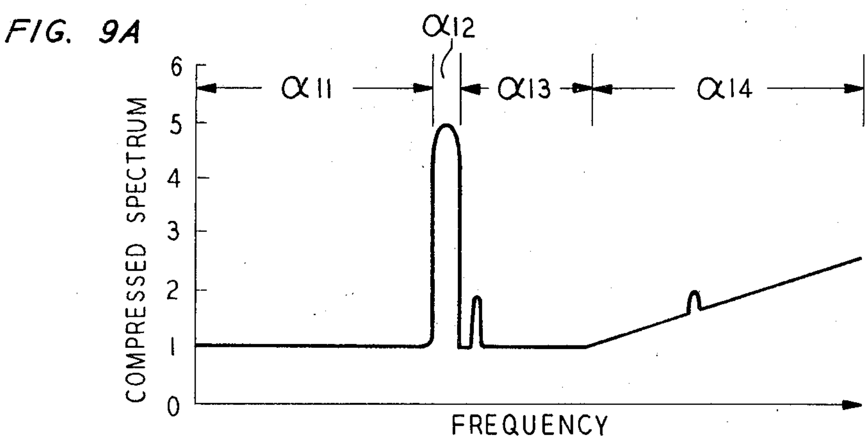
FIGS. 9A through 9D illustrate a set of signal waveforms at various points within the equalizer apparatus shown in FIG. 8.

FIG. 9A represents the $\log_2$ converted output signal of device 10 in response to the applied spectrum signal of FIG. 2. The flat signal regions of α11 and α13 are at a level of 1 unit, the strong signal in region α12 is at a level of 5 units, the moderately strong region α13 is at a level of 2 units, and within the logarithmically rising signal in region α14 is the weak signal that extends above its background to a level of 2 units (the term "units" is used as compared to "volts" in FIG. 2 because of the log conversion).

Figure 9B:
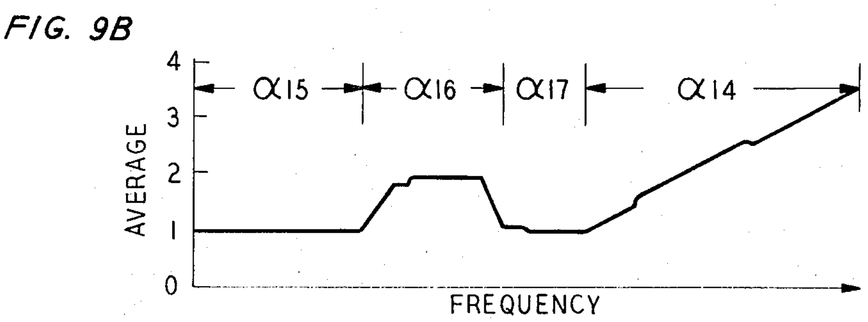

FIG. 9B shows the response of averager 21 to the applied signal of FIG. 9A, from which the following predominant characteristics can be observed. The noise average in region α15 is flat, corresponding to the flat signal in region α11. The noise average in region α16 is at a higher level than in region α15 because of the influence of the strong periodic signal. The noise average in region α17 is flat, corresponding to the flat signal in region α13, and the noise-mean in region α14 rises in a logarithmic manner corresponding to the logarithmic rise of the spectrum in region α14 of FIG. 9A.

Figure 9C:
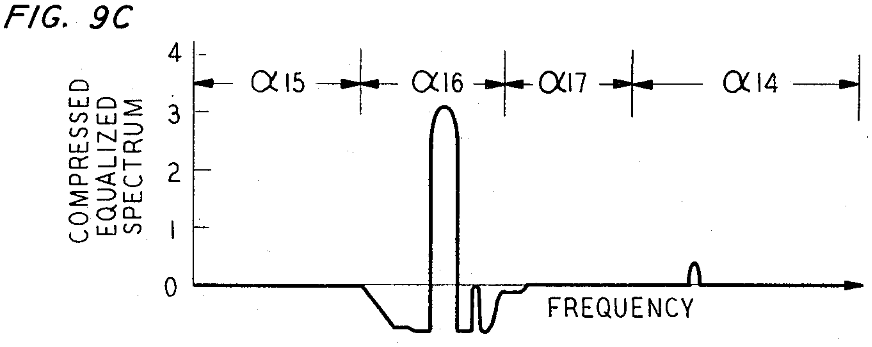
Figure 9D:
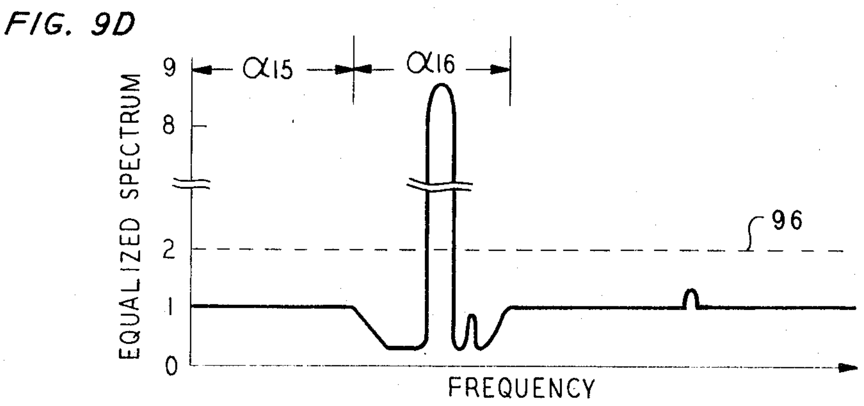

FIG. 9C represents the output signal of subtractor 41. In FIG. 9C regions α15 and α17 and α14 contain a signal that is flat, at zero units, and the weak periodic signal, at 0.44 units. The signal in region α16 is negative, at −0.92 units, and the strong periodic signal and the moderately strong periodic signal are depressed to 3.14 units and to zero units, respectively. Upon expansion with the inverse log converter 11 the equalized spectrum, shown in FIG. 9D, assumes the general characteristics of the equalized spectrum in FIG. 7, except that quantitatively, the equalized spectrum of FIG. 9D is improved.

Specifically, in FIG. 7, the flat spectrum in region α16 is at a level of 0.25 volts, the moderately strong periodic signal is at 0.53 volts and the strong periodic signal attains a level of 4 volts. In FIG. 9D, on the other hand, the flat spectrum in region α16 is at 0.33 volts, the moderately strong periodic signal reaches 1 volt, and the strong periodic signal attains a level of 8.8 volts. From the above results it is clear that the use of a geometric mean in the improved noise spectrum equalizer of FIG. 8 affords substantial advantages over the arithmetic mean equalizer of FIG. 5. The strong periodic signal has increased by over 100 percent, the moderately strong periodic signal has increased by almost 100 percent, and the depressed background noise in the neighborhood of the strong periodic signal has risen by over 30 percent.

Still further improvements in noise spectrum equalization can be had if the aforementioned spectrum signal preconditioning includes, inter alia, signal detection prior to equalization. One embodiment in accordance with the principles of this invention is illustrated in FIGS. 10A–10D. FIG. 10A shows a general block diagram of the noise spectrum equalizer apparatus. Operation of the system shown in FIG. 10A is as follows.

Device 51, comprises the first detection stage of the equalizer, wherein strong periodic signals are detected. In response to applied power spectrum samples on line 70, device 51 preconditions (by log conversion) each power spectrum sample and detects strong periodic signals. The log compressed spectrum signal appears on line 72 of device 51, and the detected-signal information appears in synchronism with the log compressed spectrum on line 71.

Device 52 comprises the intermediate detection stage of the equalizer. In response to the compressed spectrum signal and to the detected-signal information from device 51, it detects moderately strong periodic signals. The newly formulated detected-signal information appears on line 73, in synchronism with the properly deloged compressed spectrum signal appearing on line 74.

Device 53 is the final stage of the equalizer. In response to the compressed spectrum signal on line 74 and to all previously formulated detected-signal information on line 73 it performs the final equalization.

Figure 10E:
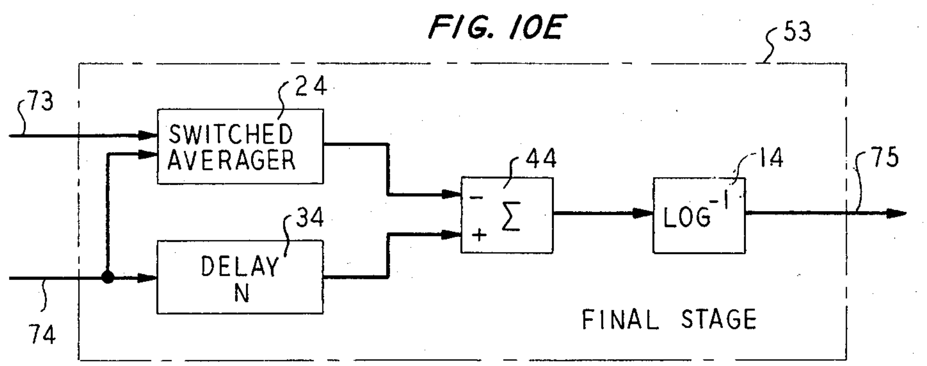
FIGS. 10B through 10E show detailed block diagrams of various stages within the apparatus shown in FIG. 10A.
Figure 10A:
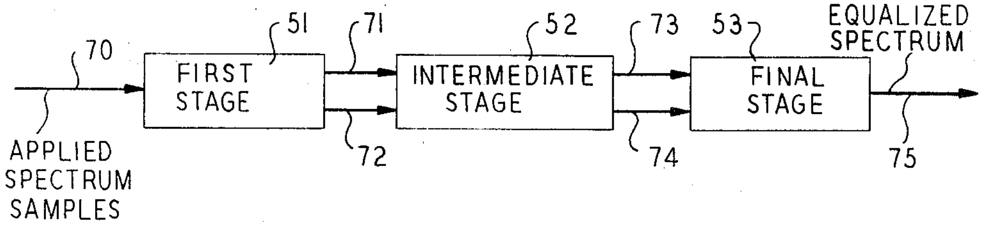
FIG. 10A is a block diagram of a further improved noise spectrum equalizer in accordance with the principles of this invention.
Figure 10B:
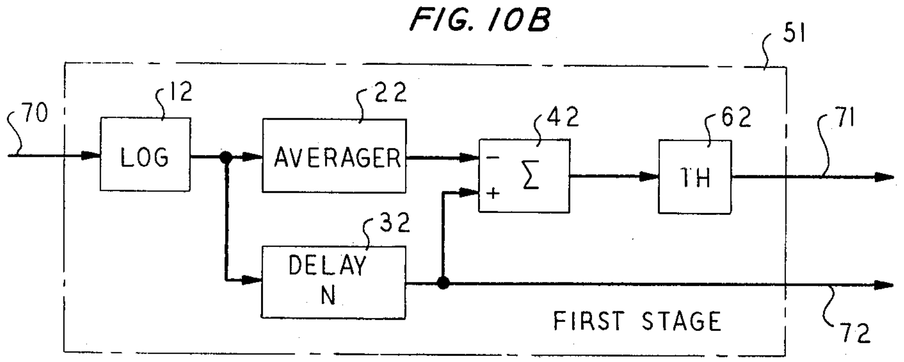

FIG. 10B depicts one embodiment of device 51. Its block diagram is similar to the one shown in FIG. 8 in that the applied spectrum signal is applied to log converter 12 (identical to the log converter 10 of FIG. 8), the output signal of converter 12 is applied to averager 22 (identical to averager 20 of FIG. 5) and to delay element 32 (identical to delay element 35 of FIG. 5), and the outputs of delay element 32 and averager 22 are applied to subtractor 42 (identical to subtractor 45 of FIG. 8). The difference between device 51 and the systems of FIG. 8 lies in that in FIG. 10B the output signal of subtractor 42, is applied to threshold detector 62, rather than to an inverse log converter 11. Threshold detector 62 compares the magnitude of its input signal to a preselected threshold signal and provides a first logic level (on line 71) when the input signal exceeds the threshold signal level, and a second logic level when the input signal does not exceed the threshold signal level. Threshold detector 62 may be any suitable subtraction circuit on a comparator circuit, which may use, for example, Texas Instruments Incorporated comparator integrated circuit (SN5485).

To provide for proper operation in a succeeding stage, device 51 must synchronize the compressed spectrum samples applied to a succeeding stage with its generated detected-signal information. Accordingly, since the output signal of delay element 32 is synchronized with the output signal of threshold detector 62 (since there is no delay in elements 42 and 62) the output signal of delay element 32 is used to drive the intermediate stage of FIG. 10A, via line 72.

Figure 10C:
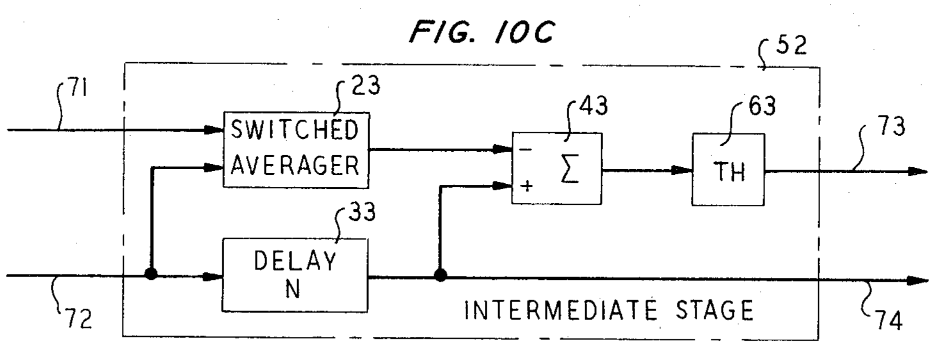

Device 52 of FIG. 10A, which is the intermediate detection stage, is shown in greater detail in FIG. 10C. Its block diagram is similar to that of device 51. The difference lies in that device 52 does not have a log converter 12 (since line 72 contains compressed spectrum samples) and averager 22 is replaced by a switched averager 23. Switched averager 23 is an averager which generates neighborhood mean detection signals by considering only those compressed spectrum samples that have not been previously detected as belonging to a strong periodic signal. In other words, when strong periodic signals are not present, switched averager 23 sums 2N applied samples and divides the sum by 2N. However, when M samples have been detected in a previous stage as belonging to a strong periodic signal, only the remaining 2N-M samples are added, and the sum is divided by the constant 2N-M.

Figure 10D:
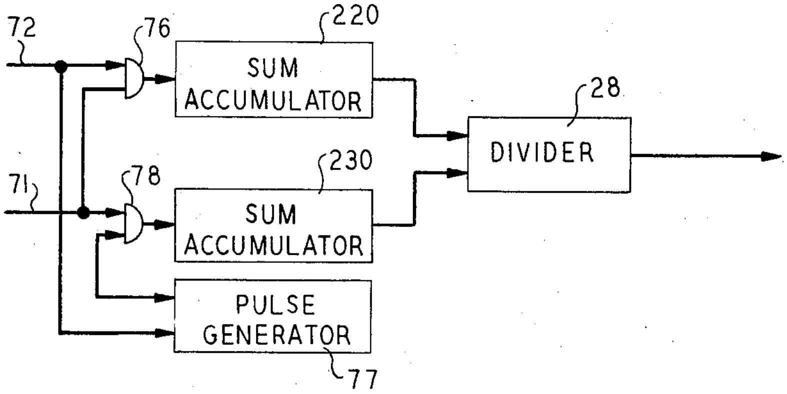

A suitable embodiment of switched averager 23 is shown in FIG. 10D. Input signals to be averaged enter switched averager 23 on line 71 and are applied to transmission gate 76. When strong periodic signals are not present, gate 76 is open, applied compressed spectrum samples enter sum accumulator 220 (which is identical to sum accumulator 210 in FIG. 6), and a signal representative of the sum of the 2N most recently applied compressed spectrum samples appears at the output of sum accumulator 220. Concurrently, pulse generator 77, which may be any suitably controllable pulse generator, generates a pulse in synchronism with the appearance of compressed spectrum samples applied to gate 76, and applies the generated pulses to transmission gate 78. When strong signals are not present, gate 78 is open, the pulse generator pulses enter sum accumulator 230 (which is identical to sum accumulator 220), and a signal representative of the number 2N appears at the output of sum accumulator 230. Divider 28 divides the output signal of sum accumulator 220 by the output signal of sum accumulator 230 and thus generates the desired neighborhood-mean detection signal. When detected-signal information on line 71 indicates, for example, that certain M spectrum samples belong to a strong periodic signal, then those M spectrum samples are blocked by gate 76 and are not included in sum accumulator 220. The corresponding M pulses are blocked in transmission gate 78 and are thus not included in sum accumulator 230, thereby developing a proper neighborhood-mean detecting signal at the output of divider 28.

FIG. 10E shows a detailed block diagram of device 53 which is the final stage of the system of FIG. 10A. It is almost identical to the block diagram of device 52, with the difference being that threshold detector 63 is replaced by inverse log converter 14. In FIG. 10E, switched averager 24 generates a neighborhood-mean equalizing signal in response to compressed spectrum samples that have not been detected in a previous stage as belonging to a strong or a moderately strong periodic signal. Delay element 34 provides for signal timing preconditioning as discussed with respect to the apparatus of FIG. 5, and subtractor 44 and inverse log converter 14 are identical to, and serve the same purpose as, subtractor 41 and inverse log converter 11, respectively, in FIG. 8. The output signal of inverse log converter 14 is the output signal of device 53, which comprises the equalized spectrum, appearing on line 75.

Figure 11A:
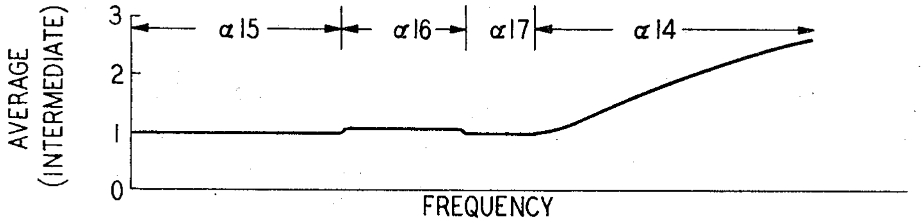
FIGS. 11A through 11E illustrate a set of signal waveforms at various points within the system of FIG. 10A.

Additional insight into the operation of the FIG. 10A system can be gained by observing the system performance in response to the applied spectrum of FIG. 2. FIGS. 9A–9D adequately describe the performance characteristics of the first detection stage, with the effect of threshold detector 62 indicated by dotted line 96 in FIG. 9D. From FIG. 9D it is clear that only the very strong periodic signal (samples 83 and 84) is detected in the first stage. Consequently, device 52 (in FIG. 10A) disregards samples 83 and 84 in its neighborhood-mean detecting signal computations. FIG. 11A indicates the resultant neighborhood-mean detecting signal in device 52. The signal in region $\alpha$15 is flat, at a level of 1 unit, the signal in region $\alpha$16 is slightly higher because of the moderately strong periodic signal effect (sample 85), the signal in region $\alpha$17 is flat, at level 1 unit, and the signal in region $\alpha$14 is rising logarithmically as in region $\alpha$14 in FIG. 9A.

Figure 11B:
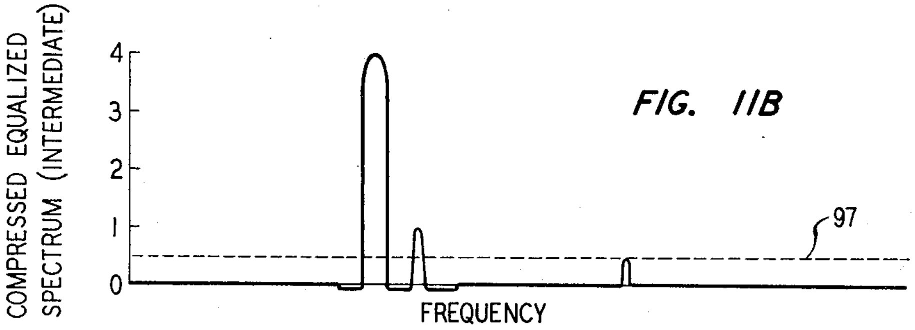

FIG. 11B illustrates the output signal of subtractor 43, and dotted line 97 depicts the signal level of threshold detector 63. From FIG. 11B it is evident that the moderately strong periodic signal (sample 85) is detected in device 52 as well as the already detected strong periodic signal of samples 83 and 84.

Figure 11C:
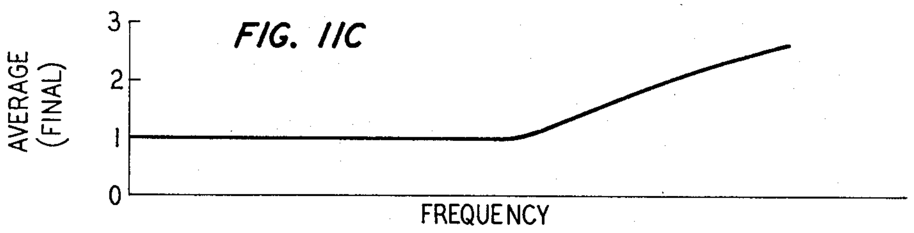

FIG. 11C illustrates the neighborhood mean equalizing signal of the final stage. This waveform is flat in regions $\alpha$15, $\alpha$16 and $\alpha$17. In region $\alpha$14 the waveform is rising logarithmically, in the same manner as it does in region $\alpha$14 of FIG. 9A.

Figure 11D:
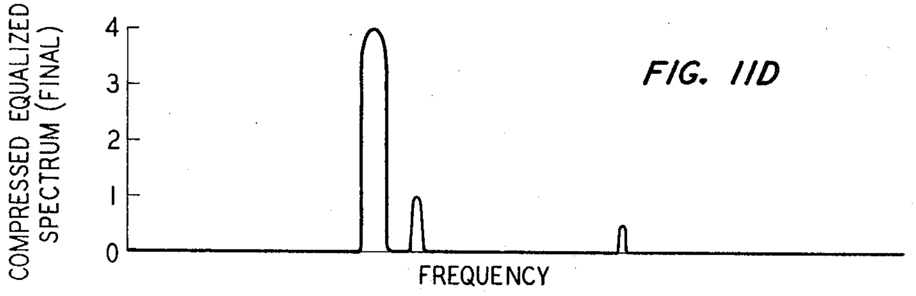
Figure 11E:
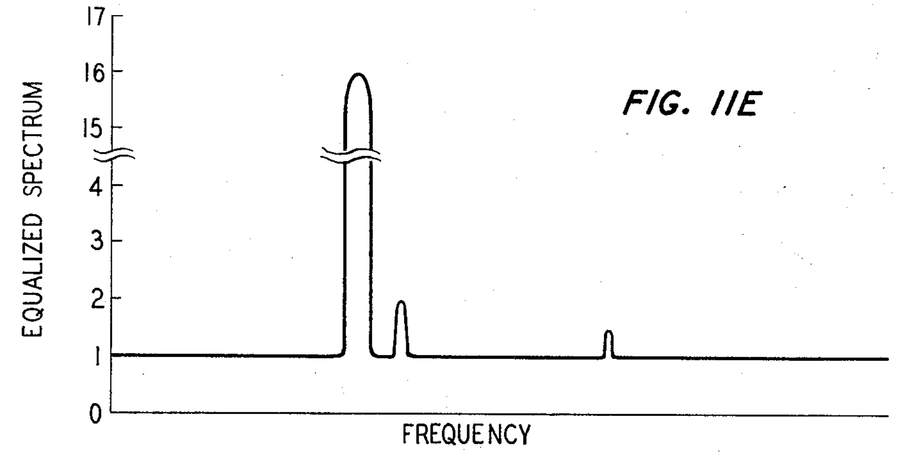

FIG. 11D shows the compressed equalized spectrum signal emanating out of subtractor 44 in device 53. The signal in FIG. 11D is flat, at level zero units, in all regions except in the regions where the strong periodic signal, the moderately strong periodic signal, and the weak periodic signal exist. The final output signal, emanating out of inverse log converter 14 is shown in FIG. 11E. The signal in FIG. 11E is flat, at a level of 1 volt, in all regions except in the regions where the strong periodic signal, the moderately strong periodic signal, and the weak periodic signal exist, extending to 16 volts, 2 volts, and 1.35 volts, respectively.

Two important improvements in system response, as illustrated in FIG. 11E, are immediately evident.

1. There is no depression of the noise spectrum in the vicinity of the strong signal.

2. The strong signal and the moderately strong signal are not attenuated with respect to background noise.

It is to be understood that the embodiments shown and described herein are illustrative of the principles of this invention only and that modifications may be implemented by those skilled in the art without departing from the spirit and scope of this invention. For example, all delay elements may be combined into a single, random access, standard, memory element, with proper addressing, thus achieving greater simplicity of hardware and associated cost reduction. Further, the computations in each stage are similar enough to each other, that time sharing of a single computing apparatus may be possible, with further reduction in hardware complexity and cost.

What is claimed is:

1. The method of equalizing applied power spectrum samples representative of functions containing periodic signals embedded in noise comprising the steps of:

preconditioning each of said applied power spectrum samples to reduce the effects of strong periodic signals;

obtaining a neighborhood-mean equalizing signal associated with each of said applied power spectrum samples by forming an amplitude average of a predetermined number of said preconditioned spectrum samples in the vicinity of said preconditioned power spectrum samples; and equalizing each of said applied power spectrum samples by arithmetically combining each of said preconditioned power spectrum samples with each of said associated neighborhood-mean equalizing signals.

2. The method defined in claim 1 wherein said step of preconditioning each of said applied power spectrum samples comprises compressing each of said applied power spectrum samples in accordance with a $\log_2$ compression function.

3. The method for spectrum equalization of applied power spectra composed of power spectrum samples comprising the steps of:

1. compressing said power spectrum samples in accordance with a $\log_2$ function;
2. forming a sum of adjacent N, a predetermined number, of said compressed spectrum samples at frequencies immediately below a preselected compressed spectrum sample, with said preselected sample and with adjacent N−1 of said compressed spectrum samples at frequencies immediately above said selected compressed spectrum sample;
3. dividing said sum by 2N;
4. subtracting said divided sum from said preselected compressed spectrum sample, thereby obtaining an equalized compressed spectrum sample of said preselected compressed spectrum sample;
5. expanding each of said compressed equalized spectrum samples in accordance with a $\log_2^{-1}$ function, thereby obtaining equalized spectrum samples;
6. subtracting from said sum the compressed spectrum sample of lowest frequency included in said sum and adding to said sum the compressed spectrum sample adjacent to and higher than the highest frequency sample included in the sum;
7. selecting a new compressed spectrum sample, adjacent to and at a higher frequency than said preselected spectrum sample, to be equalized; and
8. repeating steps (2) through (7) thereby successively equalizing higher frequency selected spectrum samples until the highest frequency spectrum sample to be equalized is processed.

4. The method for spectrum equalization of applied power spectrum samples representative of functions containing periodic signals embedded in noise comprising the steps of:

detecting all of said power spectrum samples that are representative of strong periodic signals in said functions to obtain a set of detected spectrum samples;

developing a neighborhood-mean equalizing signal associated with each of said power spectrum samples by forming an amplitude average of only those of said power spectrum samples, within a preselected number of said power spectrum samples in the vicinity of each of said power spectrum samples, that do not belong to said set of detected spectrum samples; and equalizing each of said power spectrum samples by arithmetically combining each of said power spectrum samples with said associated neighborhood-mean equalizing signal.

5. The method defined in claim 4 wherein the step of detecting a set of strong periodic spectrum samples comprises the further steps of:

compressing each of said applied power spectrum samples in accordance with a compression function; and detecting those of said compressed power spectrum samples that represent strong periodic signals in said functions.

6. The method defined in claim 4 wherein said step of detecting said strong periodic signals includes a plurality of detecting steps each of which comprises the substeps of:

obtaining a neighborhood-mean detecting signal associated with each of said compressed spectrum samples by forming an amplitude average of only those of said compressed power spectrum samples within said preselected number of said power spectrum samples in the vicinity of each of said compressed spectrum samples, which have not been detected in a previous substep;

subtracting from each of said compressed spectrum samples each of said associated neighborhood-mean detecting signals and a threshold signal of a preselected level, thereby forming a positive signed difference signal or a negative signed difference signal; and identifying all of said compressed spectrum samples forming said positive signed difference signals as belonging to said set of detected spectrum samples.

7. Apparatus for noise spectrum equalization of applied spectrum samples comprising:

means responsive to said applied spectrum samples for compressing each of said applied spectrum samples in accordance with a predetermined compression function;

means responsive to said compressed spectrum samples for developing neighborhood-mean equalizing signals associated with each of said applied spectrum samples; and means responsive to said compressed spectrum samples and to said associated neighborhood-mean equalizing signals for equalizing each of said spectrum samples by arithmetically combining each of said spectrum samples with each of said associated neighborhood-mean equalizing signals.

8. The apparatus defined in claim 7 wherein said equalizing means further comprises:

means responsive to said compressed equalized spectrum samples for expanding each of said compressed equalized spectrum samples in accordance with an expansion function that is an inverse function of said compression function.

9. Apparatus for spectrum equalization of applied power spectrum samples representative of functions containing periodic signals embedded in noise comprising:

means responsive to said applied power spectrum samples for detecting spectrum samples which are representative of strong periodic signals in said functions;

means, responsive to said applied power spectrum samples and to said means for detecting strong periodic signals, for developing a neighborhood-mean equalizing signal associated with each of said power spectrum samples by forming an amplitude average of only those of said power spectrum samples, within a preselected number of said power spectrum samples in the vicinity of each of said power spectrum samples, which have not been detected in said means for detecting strong periodic signals; and means responsive to said power spectrum samples and to said associated neighborhood-mean equalizing signals for equalizing each of said power spectrum samples by arithmetically combining each of said power spectrum samples with each of said associated neighborhood-mean equalizing signals.

10. The apparatus defined in claim 9 wherein said means for developing a neighborhood-mean equalizing signal comprises:

a first transmission gate responsive to said applied power spectrum samples and to said means for detecting strong periodic signals for gating said applied power spectrum samples;

a first sum accumulator responsive to said first transmission gate output signals for developing an accumulated sum of the 2N most recently applied of said power spectrum samples;

a pulse generator responsive to said applied power spectrum samples for generating a pulse at each appearance of said applied power spectrum samples;

a second transmission gate responsive to said pulse generator and to said means for forming said set of detected spectrum samples output signal for gating said pulse generator pulses;

a second sum accumulator responsive to said second transmission gate for developing an accumulated sum of said gated pulses corresponding to the appearance of the most recent 2N of said pulses applied to said second transmission gate; and means for dividing said first accumulator output signal by said second accumulator output signal, thereby forming the desired neighborhood-mean equalizing signal.

11. The apparatus defined in claim 9 wherein said means for detecting strong periodic signals comprises:

means for compressing each of said applied spectrum samples in accordance with a compression function; and means for detecting those of said compressed spectrum samples that represent strong periodic signals.

12. The apparatus defined in claim 11, wherein said means for equalizing comprises:

means for subtracting from each of said compressed power spectrum samples each of said associated neighborhood-mean equalizing signals; and means responsive to said subtracting means output signal for expanding said signal in accordance with an expansion function that is an inverse function of said compression function.

13. The apparatus defined in claim 12, wherein said compression function and expansion function are a $\log_2$ function and a $\log_2^{-1}$ function, respectively.

14. The apparatus defined in claim 9, wherein said means for detecting strong periodic signals further comprises:

means for compressing each of said applied spectrum samples by a compression function; and means, responsive to the output signal of said means for compressing, for successively detecting those of said compressed power spectrum samples that represent strong periodic signals.

15. The apparatus defined in claim 14, wherein said means for successively detecting spectrum samples which represent strong periodic signals comprises a cascade interconnection of a plurality of detection stages, each stage responsive to said compressed spectrum samples and to said detected spectrum samples from the immediately preceding detection stage.

16. The apparatus defined in claim 15 wherein at least one of said detection stages comprises:

switched averager means, responsive to said compressed spectrum samples and to said detected spectrum samples from said immediately preceding detection stage, for developing neighborhood-mean detecting signals associated with each compressed spectrum sample, by forming an amplitude average of only those of said compressed spectrum samples in the neighborhood of said associated spectrum sample which are not included in the set of detected spectrum samples from said previous detection stage;

first subtraction means responsive to said compressed spectrum samples and to said switched averager means output signal for subtracting each of said associated neighborhood-mean detecting signals from each of its said associated compressed spectrum samples; and second subtraction means, responsive to said first subtraction means output signals, for subtracting from said first subtraction means output signal a threshold signal of a preselected level, thereby developing a second subtraction means output signal which indicates, by its sign, the existence of compressed spectrum samples indicative of strong periodic signals in said function.

* * * * *